No. 769,161. PATENTED SEPT. 6, 1904.
P. T. HOUSTON.
INDICATING THE FLOW OF LUBRICANT IN FORCED LUBRICATING SYSTEMS.
APPLICATION FILED FEB. 17, 1903.
NO MODEL.

Attest
Inventor
Percival T. Houston
by Richards & Co.
Attys

No. 769,161. Patented September 6, 1904.

UNITED STATES PATENT OFFICE.

PERCIVAL TURNER HOUSTON, OF LONDON, ENGLAND.

INDICATING THE FLOW OF LUBRICANT IN FORCED LUBRICATING SYSTEMS.

SPECIFICATION forming part of Letters Patent No. 769,161, dated September 6, 1904.

Application filed February 17, 1903. Serial No. 143,869. (No model.)

*To all whom it may concern:*

Be it known that I, PERCIVAL TURNER HOUSTON, engineer, a subject of the King of England, and a resident of London, in the county of London, England, have invented certain new and useful Improvements in Indicating the Flow of Lubricant in Forced Lubricating Systems, of which the following is a specification.

This invention has reference to indicating the flow and action of lubricant in forced lubricating systems, and has chiefly for its object to provide a simple and efficient means or apparatus for accomplishing this effect.

In forced lubricating systems lubricant—say oil or grease—is forced from a cylinder or other forcing apparatus containing oil in bulk sufficient to supply generally a plurality of bearings or other joints or parts to be lubricated and the lubricant is distributed through several conduits or pipes leading to the several parts or joints or points of supply. According to my invention in such systems there is introduced and employed upon the oil-service conduits or conduit a part which is or can be moved by the flow of oil, and by this movement the rate of feed and action going on in the oil-conduit or in the respective conduits of the system, as the case may be, the behavior and rate of feed or flow is indicated and made known. In forced lubricant systems, therefore, according to this invention an engineer need never be in ignorance as to the supply of lubricant to any particular bearings or parts of the engines or machines in his charge.

The invention will be further described with the aid of the accompanying drawings, in which—

Figure 1:
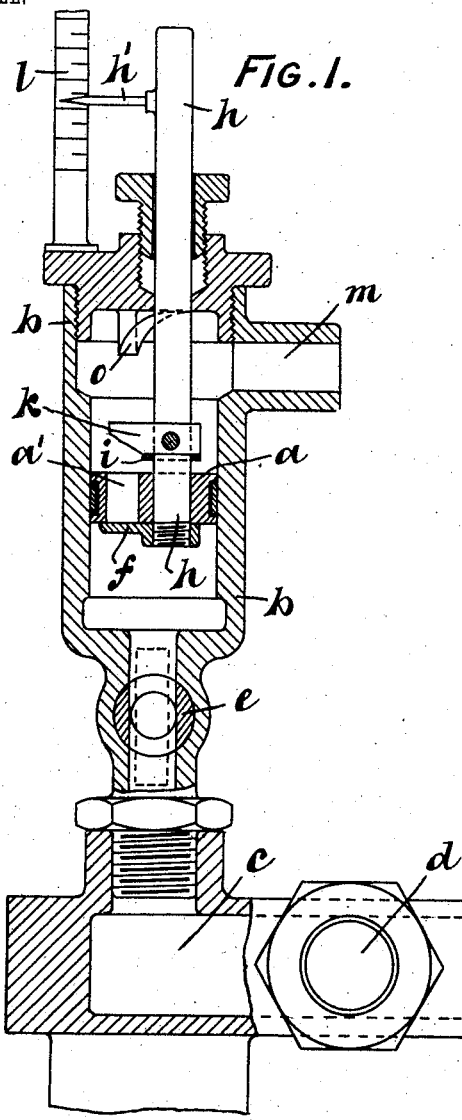
Figure 2:
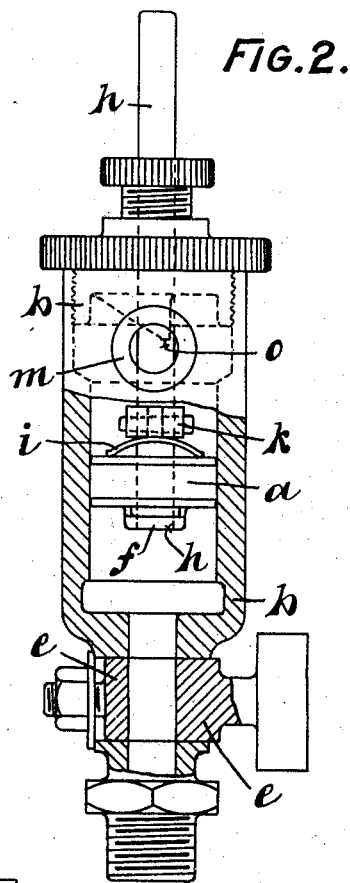
Figure 3:
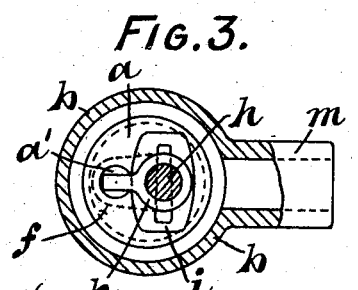

Figure 1 is a front sectional elevation, Fig. 2 is a side elevation, partly in section, and Fig. 3 is a plan in cross-section, illustrating the apparatus.

In the arrangement shown the part which is moved by the flow of lubricant from the oil-forcing apparatus on its way to the several bearings consists of a piston which works up and down in a cylinder. The piston is designated $a$ and the cylinder $b$, and the lower end of the cylinder is fixed upon and communicates by an inlet branch $d$ with a header $c$, connected with the lubricant-forcing cylinder or apparatus, containing lubricant in bulk, and the outlet is by the branch $m$ at the top of the cylinder. The header $c$ will have upon it a plurality of cylinders $b$ with their pistons for supplying a plurality of bearings or parts to be lubricated. Between the header $c$ and the cylinder $b$ there is a cock $e$ for regulating the flow to the different bearings or parts. The piston $a$ has a port or aperture $a'$ through it, in connection with which a valve $f$ works, this valve being fixed on the end of the rod $h$, passed through and loosely connected with the piston. The port $a'$ is normally kept closed by the valve $f$. This is accomplished by a spring $i$, placed between the upper face of the piston and a tappet $k$ on the rod $h$. Thus the piston is pressed down on the valve $f$, so as to close the port $a'$. The rod $h$ is carried through the top of the cylinder $b$ and has a pointer $h'$, which works in connection with the indicator-scale $l$, by which the action of the apparatus can be accurately observed. The port $a'$ of the piston $a$ is covered and uncovered in the up and down strokes, respectively, its opening action taking place automatically when it reaches the top of its upstroke by tappet $k$ striking the inclined edge or face of the inclined stationary cam $o$, formed on the inside of the cylinder-cover. Thus the rod $h$, with the valve attached thereto, comes to rest; but the piston $a$ continues its upward movement, by reason of the pressure of the lubricant on its under face overcoming the pressure of the spring $i$.

In action, assuming the system to be in operation, the operator takes hold of the projecting part of rod $h$ and presses the same downwardly and at the same time giving it a turning movement. Thus the valve $f$ is turned to uncover port $a'$ and the piston $a$ moves toward the bottom of the cylinder. By this downward movement of the piston the fluid is forced through the port $a'$ and fills the cylinder above the piston. When the piston reaches the limit of its downward movement, the operator turns the rod $h$, so as to cover the port again by the valve $f$. The operator now lets go of the rod $h$, and the lubricant from the general forcing apparatus presses against the bottom face of the piston and forces the same up, thus forcing the lubricant above the piston through the branch m to the bearings to be lubricated. By means of the rod h and the indicator connected therewith the rate of supply of lubricant can be seen. When the piston reaches the top of its stroke, the tappet k strikes the cam o and opens the port a'.

Having now particularly described my invention, what I claim as new, and desire to secure by Letters Patent, is—

1. In combination with a lubricant-forcing apparatus, a cylinder, a piston therein, said cylinder having an inlet-port therein behind the piston, said inlet-port being connected with the apparatus, the cylinder also having an outlet-port on the other side of the piston, and means for making and breaking communication between the opposite sides of the piston, substantially as described.

2. In combination, with a lubricant-forcing apparatus, a cylinder, a header connecting the bottom of the cylinder with the said apparatus, said cylinder having an outlet in the upper part thereof, a piston in the cylinder having a port therein, a valve controlling said port, and a rod fixed to the valve and connected with the piston and passing through the upper part of the cylinder, substantially as described.

3. In combination, with a lubricant-forcing apparatus, a cylinder, a header connecting the bottom of the cylinder with the said apparatus, a regulating-cock for controlling the supply to the cylinder, said cylinder having an outlet-port therein, a piston in the cylinder having a port therein, a valve $f$ for opening and closing the port, a rod fixed to the valve and connected to the piston, and passing through the upper port of the cylinder, a tappet on the rod and a cam at the top of this cylinder operating in connection with the tappet to open the port, substantially as described.

In witness whereof I have hereunto set my hand in presence of two witnesses.

PERCIVAL TURNER HOUSTON.

Witnesses:
  JOHN H. WALKER,
  S. GOODALL.